June 6, 1972  R. H. KAUFMAN ET AL  3,667,995
METHOD FOR COATING A REINFORCED HOSE
Filed Nov. 5, 1970
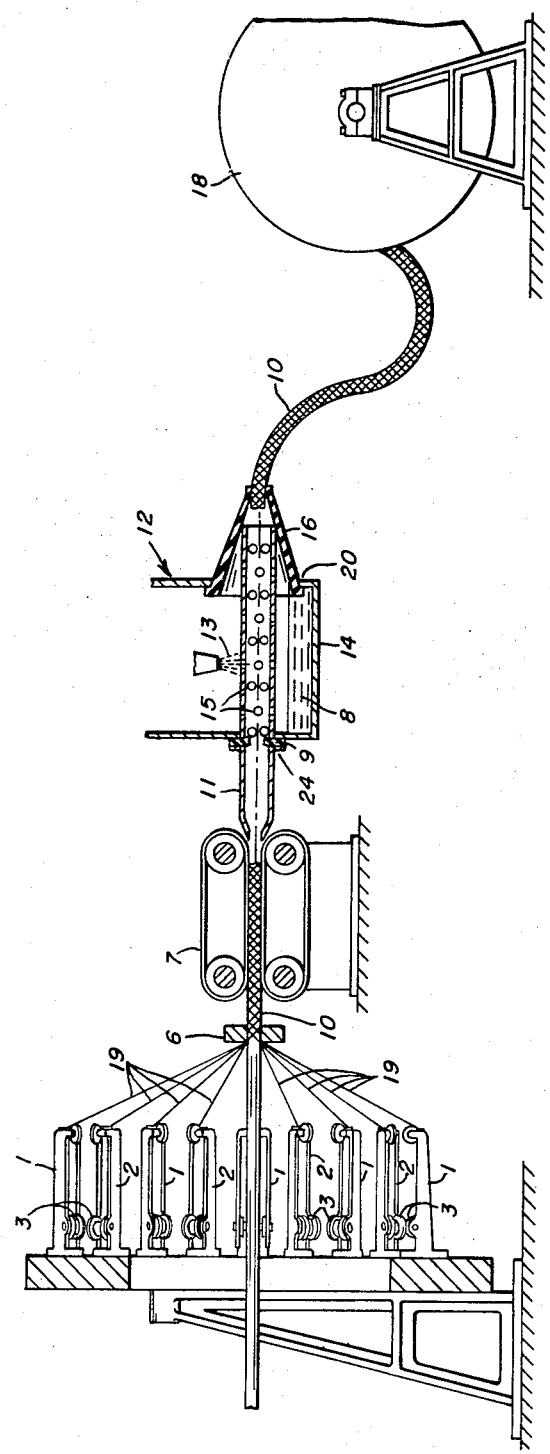
INVENTORS
ROBERT H. KAUFMANN
DONALD RICHARDSON

United States Patent Office 3,667,995
Patented June 6, 1972

3,667,995
METHOD FOR COATING A REINFORCED HOSE
Robert H. Kaufman, Temple, and Donald Richardson, Wyomissing, Pa., assignors to North American Rockwell Corporation, Pittsburgh, Pa.
Filed Nov. 5, 1970, Ser. No. 87,062
Int. Cl. B44d *1/08, 1/06*
U.S. Cl. 117—94                                               5 Claims

ABSTRACT OF THE DISCLOSURE

An improved method for manufacturing strand reinforced flexible hose comprising moving a strand covered hose carcass through a coating stage in such a manner that substantially only compressive forces are present in the hose carcass in the direction parallel to its longitudinal axis at the time the hose is wound on a reel for storage. The hose is ridded of any excess coating material and stored on a reel or other suitable storage device at a rate not greater than the rate at which the hose is exiting from the coating operation. The apparatus comprises means for moving the hose through the coating operation with substantially only compressive forces as aforesaid, and means for coating the strand reinforced hose.

BACKGROUND OF THE INVENTION

Field of the invention

The field to which this invention relates might be generally characterized as that relating to the manufacture of reinforced hose suitable for containing high pressure fluids. More specifically, the invention concerns an improved process for producing high pressure hose whereby during the application of a coating material, usually the final outer coating, the tube is moved in such a way that there is a minimum of tension within the hose. The invention also relates to an improved apparatus for effecting the above process.

Description of the prior art

It has been known to form a reinforced high pressure hose by applying one or more reinforcing coverings of strands of thread, either wire or yarn, on a hose carcass of rubber or the like. The coverings are generally applied in either spiral or braided form by any suitable apparatus. Conventionally, the entire hose carcass is drawn through such braiding or spiraling operations by a traction means. An endless belt draw-off device is typically used because of its greater area of surface contact. The term "endless belt" is meant to include those devices where the "belt" is made up of a series of connected links. Upon leaving the traction means, the hose carcass is in a relaxed state with the covering strands in tight engagement therewith. A final covering of an adhesive liquid coating is applied by drawing the hose carcass through a coating chamber by means of a windup reel.

A major defect in the quality of the final product frequently results because of the comparatively high tensile stresses created within the hose as it is drawn through a final wiping stage. Pulling the hose carcass through the coating chamber causes elongation of the hose carcass and this elongation causes a deleterious separation of the reinforcing strands. While on the reel, the adhesive liquid coating applied to the hose cures and sets, thereby retaining the reinforcing strands in their separated condition.

High internal fluid pressure applied to the hose in operation may cause premature hose rupture at points where the reinforcing strands are not in tight engagement with the hose carcass or where a deformed nonuniform hose carcass cross section is present. Such hose rupture can present extremely hazardous work conditions to workmen in the immediate vicinity of such a failure, as for example, leakage of scalding liquid or steam.

SUMMARY OF THE INVENTION

In order to prevent hose carcass elongation, with consequent separation of reinforcing strands and nonuniform hose carcass cross section, caused by pulling the hose through the final coating chamber and to allow ease of mandrel withdrawal, this invention teaches both an apparatus and method for moving the hose through the coating chamber with substantially only compressive forces thereon. Traction means, such as an endless belt, link-type draw-off device, push the hose through a restraining guide which is in cooperative association with the coating chamber. This guide functions as a means to prevent buckling of the hose. By winding the hose on the take-up reel at a rate of hose travel no greater than the rate at which it is pushed through the coating stage, hose elongation and reinforcing strand separation is prevented.

BRIEF DESCRIPTION OF THE DRAWING

Other features of the invention will become apparent from the following more detailed description and from the accompanying drawing, in which:

The figure is a side elevational view in partial section of the apparatus showing coating chamber 12 somewhat out of scale for better detail.

DESCRIPTION OF THE PREFERRED EMBODIMENT

Referring now to the apparatus shown in the figure, a hose carcass 10 is shown being drawn through a conventional braiding machine comprising a ring of shuttle devices 1 and a second ring of shuttle devices 2. It is to be understood that a removable, flexible mandrel is placed inside the hose carcass as a support and carrier member during process operations. In the operation of the machine, the two rings of shuttle devices are driven around the axis of the machine respectively in opposite directions, the shuttle devices in each ring traversing a sinuous path intersecting, at a number of points, the sinuous path traversed by the other ring of shuttle devices. Each shuttle device has a bobbin 3 from which its respective strand or thread 19 is taken. The threads 19 from the shuttles converge to the core carcass 10, at which they meet in braided fashion at the left (as viewed in the figure) of a fixed ring 6. The threads in the form of a braided covering overlapping the hose carcass 10 are drawn with the hose carcass 10 through the ring 6 by a conventional chain-link (endless belt) draw-off device 7 which is positively driven and acts as a traction means. It is to be understood that the braided covering formed by threads 19 could as well be a conventional wire or yarn wound covering instead of a braided covering. The particular apparatus by which braiding or spiral winding occurs is conventional and of itself does not form a part of this invention.

After the hose carcass 10 has been drawn through the braiding or spiraling apparatus and covered with a suitable overlay of reinforcing material by the draw-off device 7, this same draw-off device acts to move the strand reinforced hose toward means 12 which defines a coating chamber. It is within this chamber formed by means 12 that the reinforced hose 10 is coated with a suitable coating material such as rubber or other elastomeric material.

The coating chamber 12 has an entrance end 24 and a larger exit end 20 through which the hose may enter and exit from the chamber. Although the strand reinforced hose 10 possesses a greater degree of rigidity than would a nonreinforced hose, depending upon the degree of reinforcing, it would still be possible for the hose to buckle or crimp as it is being pushed through the coating chamber by the draw-off device 7. To eliminate this problem, which would result in separation of the strands comprising the reinforcing layer and thereby weaken the final hose product, guide means are located within the coating chamber to restrict travel of the hose along an essentially straight line path. This guide means is advantageously in the form of an elongated tubular member 11 whose inner diameter is great enough to accommodate the external diameter of the reinforced hose together with an applied layer of coating material. With this constricting influence, even though a hose is being pushed through the coating chamber and is under essentially only compressive forces acting within the tube 11 generally parallel to the longitudinal axis thereof, it will be impossible for the hose to be subjected to bending forces sufficient in magnitude to permit separation of adjoining reinforcing strands or distortion of the uncured hose carcass.

As shown in the drawing, the coating material may be applied by means of a spray, as at 13, which directs a liquid adhesive coating material onto the outer surface of guide means 11 from where it enters into the interior of the guide member as by means of holes or openings 15. In view of the fact that not all of the coating material will enter into the interior of the guide means or will enter and subsequently flow out, a collecting reservoir 14 has been provided in the bottom of the coating chamber. Of course, the coating material need not be applied by spraying, but could be applied by other means well known in the art, such as by submerging the hose carcass in a liquid coating material.

At the exit end 20 of chamber defining means 12, there is fixed a flexible cone wiper 16 which is of conventional form. Wiper 16 extends outside the chamber 12 and engages the hose 10 as it leaves tubular member 11. On the other hand, it should be appreciated this particular form of wiper is shown only by way of illustration as other means could as effectively be used to remove excess coating material from the outer surface of the hose.

Flexible wiper cone 16 presses the coating fluid against the reinforced hose carcass. The coating acts when cured to imbed the fabric and to secure it in its close engagement with the hose carcass. After leaving the cone wiper 16, the coated hose is then wound on a positively driven take-up reel or drum 18. By pushing the hose through the coating chamber only compressive forces are applied by the traction means and the cone wiper. The force required to overcome the resistance offered by the tightly fitting cone wiper 16 is supplied by the draw-off means 7. Thus, take-up reel 18 need only exert that force required to wind the loosely hanging and relaxed portion of the hose 10 hanging between it and the cone wiper 16. This is accomplished by winding the coating hose at a rate no higher than the rate of hose travel generated by the traction means 7, thereby avoiding placing a substantial pulling tension on the newly coated hose before the coating has had time to cure and set.

The method by which a reinforced hose having a hose carcass overlaid with at least one layer of reinforcing strands and with at least one layer of covering material is produced comprises contacting a strand covered hose carcass with means for driving or pushing the carcass to a stage where a covering material is applied, driving or pushing the strand covered carcass into and through means defining a coating chamber in such manner that only compressive forces are applied to the carcass during its passage through the chamber-defining means, the compressive forces being created by the means for pushing or driving the hose and a wiper cone located at the end of the coating chamber, applying a coating material to the strand covered carcass during its passage through the chamber-defining means, and winding the now coated hose on a reel take-up means at a rate of hose travel no higher than the rate of hose travel of the hose through the coating chamber. The coated hose carcass is then allowed to cure while in the wound state. The supporting mandrel is subsequently withdrawn from the hose carcass in the manner normally employed by the art.

Having thus described the invention in rather complete detail, it will be understood that these details need not be strictly adhered to and that various changes and modifications may be made, all falling within the scope of the invention as defined by the following claims.

What is claimed is:

1. In a method for producing reinforced hose wherein a hose carcass is overlaid with at least one layer of reinforcing strands and with at least one layer of covering material, the steps comprising:
   (a) contacting a strand covered hose carcass with means for pushing the carcass to a coating stage where covering material is applied;
   (b) pushing the strand covered hose carcass into and through means defining a coating chamber in a manner such that compressive forces are created within the strand covered carcass in the direction generally parallel to the longitudinal axis thereof; and
   (c) applying a coating material to the strand covered carcass during its passage through the coating chamber defining means.

2. The method as recited in claim 1 further comprising the step of winding up the strand covered hose carcass after said coating material is applied at a rate of hose carcass travel not higher than the rate of hose carcass travel through the coating chamber.

3. The method as recited in claim 1 comprising guiding the hose carcass in a straight path through the coating stage.

4. The method as recited in claim 1 wherein said step of applying a coating material further comprises immersing the hose within an adhesive coating material.

5. The method as recited in claim 1 further comprising curing the coating material applied to the hose carcass while the hose carcass is in a relaxed state.

References Cited

UNITED STATES PATENTS

| | | | |
|---|---|---|---|
| 3,434,860 | 3/1969 | Fergerson et al. | 117—94 X |
| 3,157,544 | 11/1964 | Lichter | 117—94 X |
| 3,194,273 | 7/1965 | De Laubarede | 138—125 |

EDWARD G. WHITBY, Primary Examiner

U.S. Cl. X.R.

28—75; 117—105.3, 115; 118—325, 326